US012223863B2

(12) United States Patent
In

(10) Patent No.: US 12,223,863 B2
(45) Date of Patent: Feb. 11, 2025

(54) DISPLAY PANEL AND DISPLAY DEVICE INCLUDING THE SAME

(71) Applicant: Samsung Display Co., Ltd., Yongin-si (KR)

(72) Inventor: Hai-Jung In, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 161 days.

(21) Appl. No.: 17/903,468

(22) Filed: Sep. 6, 2022

(65) Prior Publication Data

US 2023/0129192 A1 Apr. 27, 2023

(30) Foreign Application Priority Data

Oct. 27, 2021 (KR) ........................ 10-2021-0144260

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2310/0278* (2013.01)

(58) Field of Classification Search
CPC ...................................................... G09G 3/006
See application file for complete search history.

(56) References Cited

U.S. PATENT DOCUMENTS

| | | | | |
|---|---|---|---|---|
| 10,109,688 | B2 | 10/2018 | Han | |
| 2010/0225770 | A1* | 9/2010 | Morimoto | G09G 3/325 29/854 |
| 2014/0167769 | A1* | 6/2014 | Kim | G09G 3/3208 324/414 |
| 2018/0350284 | A1* | 12/2018 | Park | G09G 3/006 |

FOREIGN PATENT DOCUMENTS

| | | | |
|---|---|---|---|
| KR | 100635495 | B1 | 10/2006 |
| KR | 101992273 | B1 | 10/2019 |

* cited by examiner

*Primary Examiner* — Nan-Ying Yang
(74) *Attorney, Agent, or Firm* — CANTOR COLBURN LLP

(57) ABSTRACT

A display panel includes a pixel connected to a scan line and a data line, and a lighting test circuit which provides a lighting test voltage to the pixel through the data line. The lighting test circuit includes a first test transistor including a first electrode which receives the lighting test voltage, a second electrode and a gate electrode which receives a first test control signal, and a second test transistor including a first electrode connected to the second electrode of the first test transistor, a second electrode connected to the data line and a gate electrode which receives a second test control signal.

15 Claims, 12 Drawing Sheets

SS:GW,GR,GI,EM

DISPLAY PANEL AND DISPLAY DEVICE INCLUDING THE SAME

This application claims priority to Korean Patent Application No. 10-2021-0144260, filed on Oct. 27, 2021, and all the benefits accruing therefrom under 35 U.S.C. § 119, the content of which in its entirety is herein incorporated by reference.

BACKGROUND

1. Field

Embodiments relate to a display device.

2. Description of the Related Art

A display device may include a display panel that displays an image and drivers that provide signals to the display panel. The display panel may include a plurality of pixels emitting light forming an image.

In the process of manufacturing the display device, lighting states of the pixels of the display panel may be tested before the display panel and the drivers are connected to each other. In a lighting test period before the display panel and the drivers are connected to each other, a lighting test voltage for testing the lighting states of the pixels may be applied to the pixels. The lighting test voltage may not be applied to the pixels during an image display period after the display panel and the drivers are connected to each other.

SUMMARY

Embodiments provide a display panel for preventing a lighting test voltage from being applied to the pixel in an image display period and a display device including the display panel.

An embodiment of a display panel according to the invention includes a pixel connected to a scan line and a data line; and a lighting test circuit which provides a lighting test voltage to the pixel through the data line. In such an embodiment, the lighting test circuit includes: a first test transistor including a first electrode which receives the lighting test voltage, a second electrode, and a gate electrode which receives a first test control signal; and a second test transistor including a first electrode connected to the second electrode of the first test transistor, a second electrode connected to the data line, and a gate electrode which receives a second test control signal.

In an embodiment, each of the first test transistor and the second test transistor may be an N-type transistor.

In an embodiment, each of the first test control signal and the second test control signal may have a low voltage and a high voltage which are alternating with each other in an image display period in which a data voltage is provided to the pixel through the data line. In such an embodiment, at least one selected from the first test control signal and the second test control signal may have the low voltage at all time points in the image display period.

In an embodiment, the image display period may include a data write period in which the data voltage is written to the data line and a data porch period in which the data voltage is not written to the data line. In such an embodiment, each of the first test control signal and the second test control signal may be switched from the low voltage to the high voltage or from the high voltage to the low voltage in the data porch period.

In an embodiment, each of the first test control signal and the second test control signal may be switched from the low voltage to the high voltage or from the high voltage to the low voltage every one frame period in the image display period.

In an embodiment, each of the first test control signal and the second test control signal may be switched from the low voltage to the high voltage or from the high voltage to the low voltage every plurality of frame periods in the image display period.

In an embodiment, each of the first test control signal and the second test control signal may have a constant high voltage in a lighting test period in which the lighting test voltage is provided to the pixel through the data line.

In an embodiment, each of the first test transistor and the second test transistor may be a P-type transistor.

In an embodiment, each of the first test control signal and the second test control signal may have a low voltage and a high voltage which are alternating with each other in an image display period in which a data voltage is provided to the pixel through the data line. In such an embodiment, at least one selected from the first test control signal and the second test control signal may have the high voltage at all time points in the image display period.

In an embodiment, each of the first test control signal and the second test control signal may have a constant low voltage in a lighting test period in which the lighting test voltage is provided to the pixel through the data line.

In an embodiment, each of the first test transistor and the second test transistor may be one of an oxide semiconductor transistor and an amorphous silicon transistor.

An embodiment of a display device according to the invention includes a pixel connected to a scan line and a data line; a scan driver which provides a scan signal to the pixel through the scan line; a data driver which provides a data voltage to the pixel through the data line; and a lighting test circuit which provides a lighting test voltage to the pixel through the data line. In such an embodiment, the lighting test circuit includes: a first test transistor including a first electrode which receives the lighting test voltage, a second electrode, and a gate electrode which receives a first test control signal; and a second test transistor including a first electrode connected to the second electrode of the first test transistor, a second electrode connected to the data line, and a gate electrode which receives a second test control signal.

In an embodiment, each of the first test transistor and the second test transistor may be an N-type transistor.

In an embodiment, each of the first test control signal and the second test control signal may have a low voltage and a high voltage which are alternating with each other in an image display period in which the data voltage is provided to the pixel through the data line. In such an embodiment, at least one selected from the first test control signal and the second test control signal may have the low voltage at all time points in the image display period.

In an embodiment, the image display period may include a data write period in which the data voltage is written to the data line and a data porch period in which the data voltage is not written to the data line. In such an embodiment, each of the first test control signal and the second test control signal may be switched from the low voltage to the high voltage or from the high voltage to the low voltage in the data porch period.

In an embodiment, each of the first test control signal and the second test control signal may be switched from the low voltage to the high voltage or from the high voltage to the low voltage every one frame period in the image display period.

In an embodiment, each of the first test control signal and the second test control signal may be switched from the low voltage to the high voltage or from the high voltage to the low voltage every plurality of frame periods in the image display period.

In an embodiment, each of the first test control signal and the second test control signal may have a constant high voltage in a lighting test period in which the lighting test voltage is provided to the pixel through the data line.

In an embodiment, each of the first test transistor and the second test transistor may be a P-type transistor.

In an embodiment, each of the first test control signal and the second test control signal may have a low voltage and a high voltage which are alternating with each other in an image display period in which the data voltage is provided to the pixel through the data line. In such an embodiment, at least one selected from the first test control signal and the second test control signal may have the high voltage at all time points in the image display period.

In embodiments of the display panel and the display device according to the invention, the lighting test circuit may include the first test transistor and the second test transistor which are connected to each other in series, and the low voltage and the high voltage which are alternating with each other may be applied to the gate electrode of each of the first test transistor and the second test transistor, such that threshold voltages of the first and second test transistors may not be negatively or positively shifted. Accordingly, in such embodiments, the lighting test voltage may not be applied to the pixel in the image display period.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
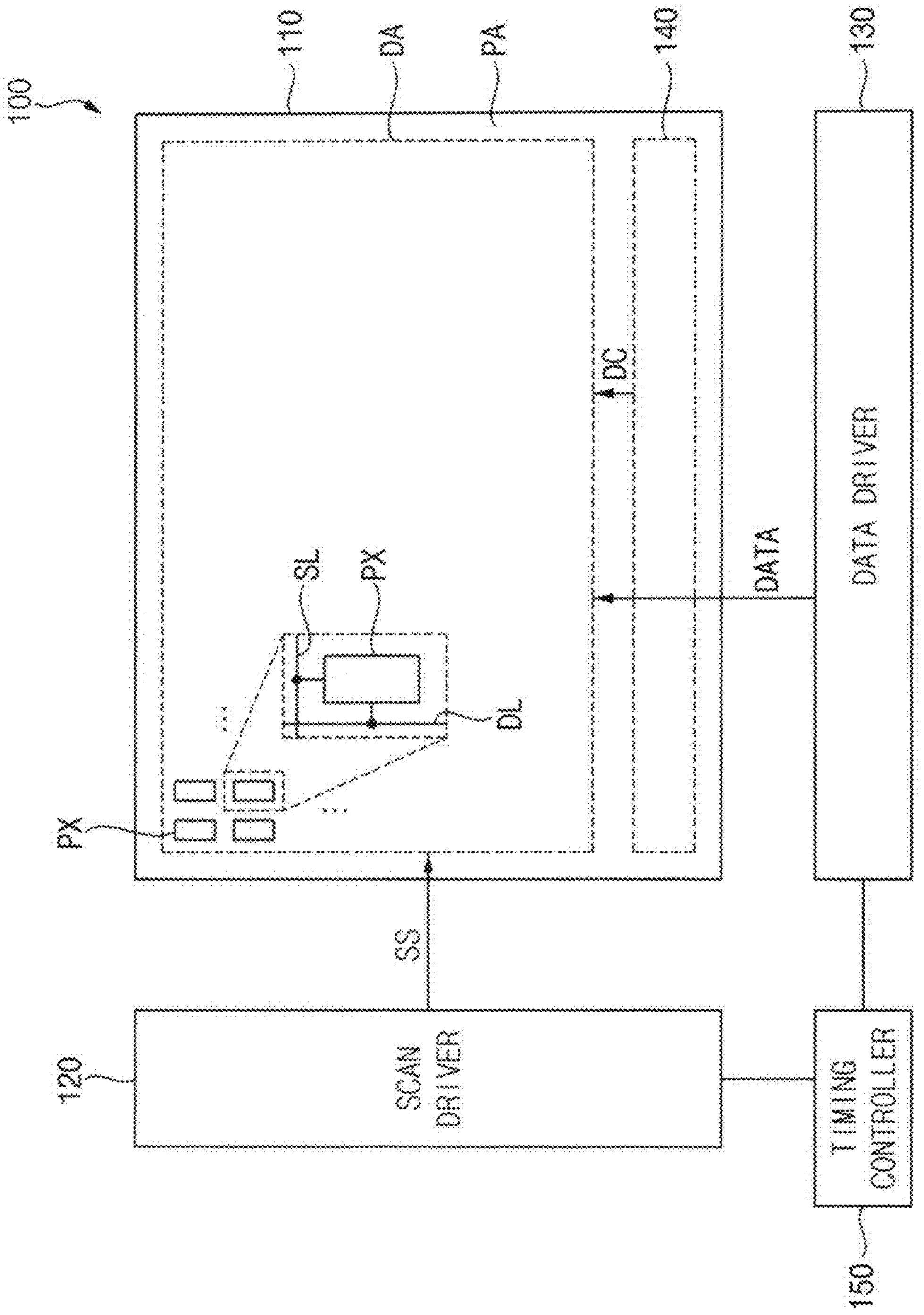
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of display devices and display panels in accordance with the invention will be described in detail with reference to the accompanying drawings.

FIG. 1 is a block diagram illustrating a display device 100 according to an embodiment.

Referring to FIG. 1, an embodiment of the display device 100 may include a display panel 110, a scan driver 120, a data driver 130, a lighting test circuit 140, and a timing controller 150.

In an embodiment, the display panel 110 may include a plurality of pixels PX, a plurality of scan lines SL, and a plurality of data lines DL which are disposed in a display area DA. Each of the pixels PX may be connected to a scan line SL and a data line DL. The scan line SL may transmit a scan signal SS. The data line DL may transmit a data voltage DATA or a lighting test voltage DC. Each of the pixels PX may emit light based on the scan signal SS and the data voltage DATA. In an embodiment, the pixels PX may include a red pixel that emits red light, a green pixel that emits green light, and a blue pixel that emits blue light.

The scan driver 120 may provide the scan signal SS to the pixels PX through the scan lines SL. The data driver 130 may provide the data voltage DATA to the pixels PX through the data lines DL during the image display period. The image display period may be a period in which the display panel 110 displays an image based on image data after the display panel 110 is connected to the scan driver 120 and the data driver 130.

The lighting test circuit 140 may provide the lighting test voltage DC to the pixels PX through the data lines DL during a lighting test period. The lighting test period may be a period in which a lighting of the display panel 110 is tested based on the lighting test voltage DC before the display panel 110 is connected to the scan driver 120 and the data driver 130.

The lighting test circuit 140 may be disposed in a peripheral area PA of the display panel 110. The peripheral area PA may surround at least a portion of the display area DA. The peripheral area PA may be a non-display area that does not display an image.

The timing controller 150 may control an operation of the scan driver 120 and an operation of the data driver 130. The timing controller 150 may provide a scan control signal to the scan driver 120, and may provide a data control signal and the image data to the data driver 130.

Figure 2:
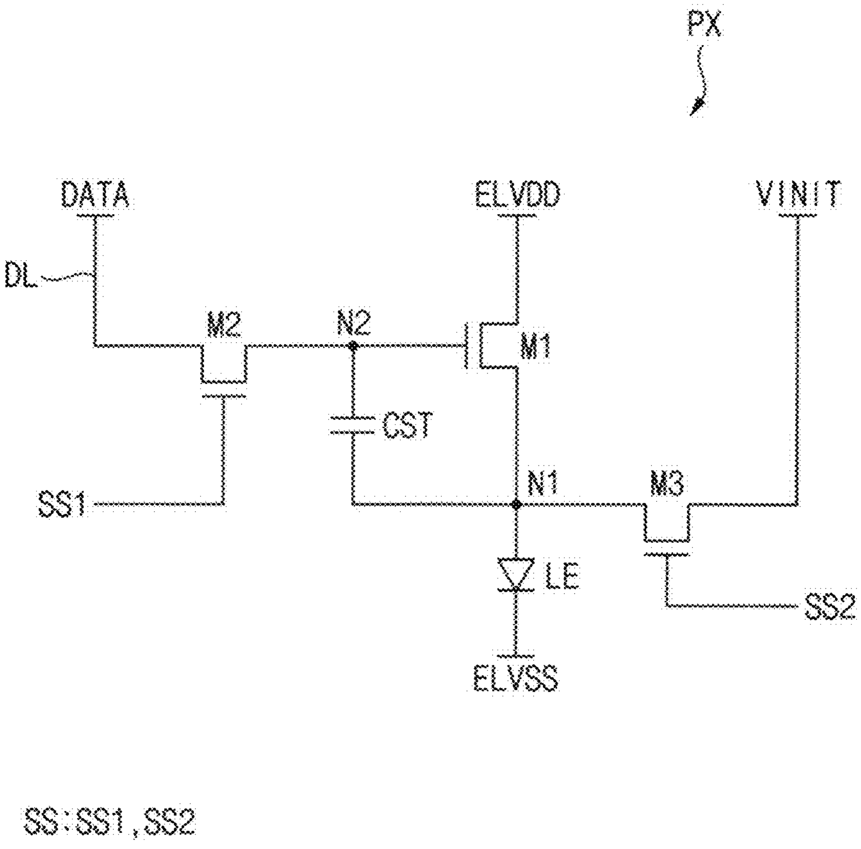
FIG. 2 is a circuit diagram illustrating a pixel according to an embodiment.

FIG. 2 is a circuit diagram illustrating the pixel PX according to an embodiment.

Referring to FIG. 2, in an embodiment, the pixel PX may include a first transistor M1, a second transistor M2, a third transistor M3, a storage capacitor CST, and a light emitting element LE. The pixel PX may receive the scan signals SS, the data voltage DATA, an initialization voltage VINIT, a first power voltage ELVDD, and a second power voltage ELVSS. The scan signals SS may include a first scan signal SS1 and a second scan signal SS2.

The first transistor M1 may be connected between a first power line providing the first power voltage ELVDD and a first node N1, and may be turned on in response to a voltage of a second node N2. A first electrode of the first transistor M1 may receive the first power voltage ELVDD, a second electrode of the first transistor M1 may be connected to the first node N1, and a gate electrode of the first transistor M1 may be connected to the second node N2. The first transistor M1 may provide a driving current to the light emitting element LE based on a voltage stored in the storage capacitor CST.

The second transistor M2 may be connected between the data line DL that provides the data voltage DATA and the second node N2, and may be turned on in response to the first scan signal SS1. A first electrode of the second transistor M2 may receive the data voltage DATA, a second electrode of the second transistor M2 may be connected to the second node N2, and a gate electrode of the second transistor M2 may receive the first scan signal SS1. The second transistor M2 may provide the data voltage DATA to the second node N2 based on the first scan signal SS1.

The third transistor M3 may be connected between an initialization line providing the initialization voltage VINIT and the first node N1, and may be turned on in response to the second scan signal SS2. A first electrode of the third transistor M3 may receive the initialization voltage VINIT, a second electrode of the third transistor M3 may be connected to the first node N1, and a gate electrode of the third transistor M3 may receive the second scan signal SS2. The third transistor M3 may provide the initialization voltage VINIT to the first node N1 based on the second scan signal SS2.

In an embodiment, each of the first transistor M1, the second transistor M2, and the third transistor M3 may be an N-type transistor. In an alternative embodiment, at least one of the first transistor M1, the second transistor M2, and the third transistor M3 may be a P-type transistor.

In an embodiment, each of the first transistor M1, the second transistor M2, and the third transistor M3 may be one of an oxide semiconductor transistor, an amorphous silicon transistor, and a polycrystalline silicon transistor.

The storage capacitor CST may be connected between the first node N1 and the second node N2. A first electrode of the storage capacitor CST may be connected to the first node N1, and a second electrode of the storage capacitor CST may be connected to the second node N2. The storage capacitor CST may store a voltage corresponding to a voltage difference between the first node N1 and the second node N2.

The light emitting element LE may be connected between a second power line providing the second power voltage ELVSS and the first node N1. An anode electrode of the light emitting element LE may be connected to the first node N1, and a cathode electrode of the light emitting element LE may receive the second power voltage ELVSS. The light emitting element LE may emit light based on the driving current.

In an embodiment, the light emitting element LE may be an organic light emitting diode ("OLED"). In an alternative embodiment, the light emitting element LE may be an inorganic light emitting diode or a quantum dot light emitting diode.

Figure 3:
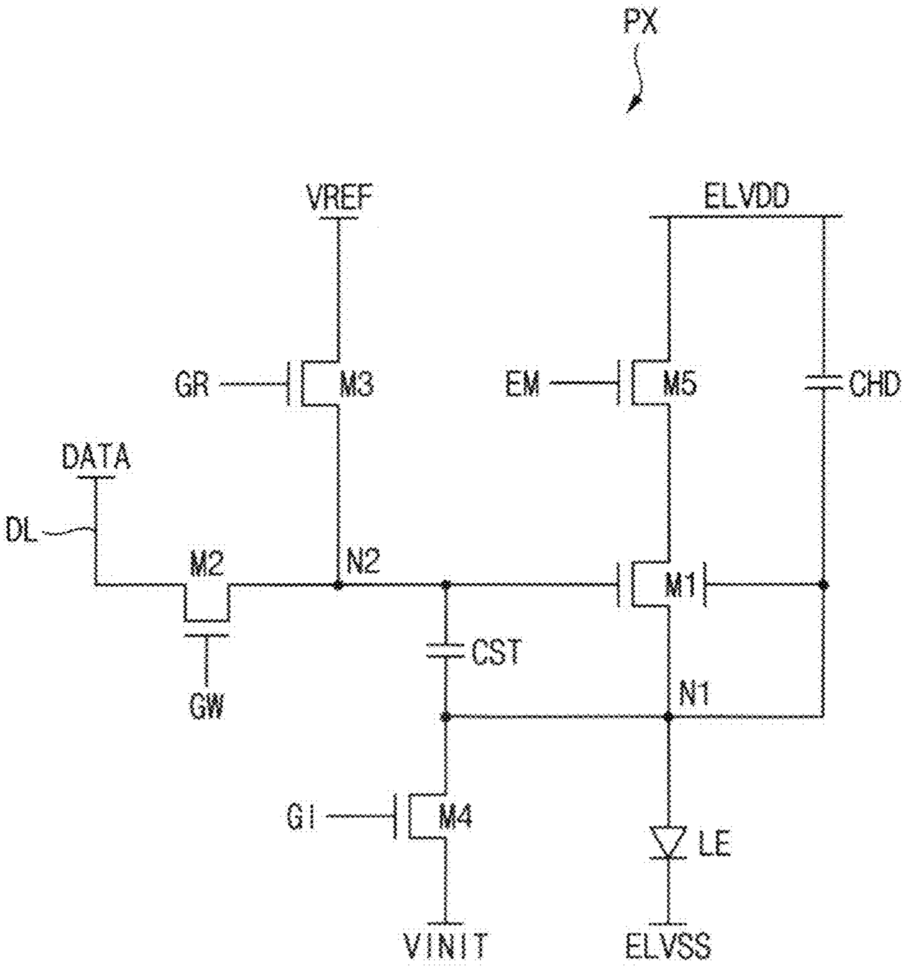
FIG. 3 is a circuit diagram illustrating a pixel according to an alternative embodiment.

FIG. 3 is a circuit diagram illustrating the pixel PX according to an alternative embodiment.

Referring to FIG. 3, in an embodiment, the pixel PX may include a first transistor M1, a second transistor M2, a third transistor M3, a fourth transistor M4, a fifth transistor M5, a storage capacitor CST, a hold capacitor CHD, and a light emitting element LE. The pixel PX may receive the scan signals SS, the data voltage DATA, a reference voltage VREF, the initialization voltage VINIT, the first power voltage ELVDD, and the second power voltage ELVSS. The scan signals SS may include a write gate signal GW, a reference gate signal GR, an initialization gate signal GI, and an emission control signal EM.

The first transistor M1 may be connected between a first power line providing the first power voltage ELVDD and a first node N1, and may be turned on in response to a voltage of a second node N2. A first electrode of the first transistor M1 may be connected to the first power line through a fifth transistor M5, and a second electrode of the first transistor M1 may be connected to the first node N1, a gate electrode of the first transistor M1 may be connected to the second node N2, and a back gate electrode of the first transistor M1 may be connected to the first node N1. Accordingly, the first transistor M1 may be a back gate transistor including the back gate electrode. The first transistor M1 may provide a driving current to the light emitting element LE based on a voltage stored in the storage capacitor CST.

The second transistor M2 may be connected between the data line DL providing the data voltage DATA and the second node N2, and may be turned on in response to the write gate signal GW. A first electrode of the second transistor M2 may receive the data voltage DATA, a second electrode of the second transistor M2 may be connected to the second node N2, and a gate electrode of the second transistor M2 may receive the write gate signal GW. The second transistor M2 may provide the data voltage DATA to the second node N2 based on the write gate signal GW.

The third transistor M3 may be connected between a reference line that provides the reference voltage VREF and the second node N2, and may be turned on in response to the reference gate signal GR. A first electrode of the third transistor M3 may receive the reference voltage VREF, a second electrode of the third transistor M3 may be connected to the second node N2, and a gate electrode of the third transistor M3 may receive the reference gate signal GR. The third transistor M3 may provide the reference voltage VREF to the second node N2 based on the reference gate signal GR.

The fourth transistor M4 may be connected between an initialization line providing the initialization voltage VINIT and the first node N1, and may be turned on in response to the initialization gate signal GI. A first electrode of the fourth transistor M4 may receive the initialization voltage VINIT, a second electrode of the fourth transistor M4 may be connected to the first node N1, and a gate electrode of the fourth transistor M4 may receive the initialization gate signal GI. The fourth transistor M4 may provide the initialization voltage VINIT to the first node N1 based on the initialization gate signal GI.

The fifth transistor M5 may be connected between the first power line and the first transistor M1, and may be turned off in response to the emission control signal EM. A first electrode of the fifth transistor M5 may receive the first power voltage ELVDD, a second electrode of the fifth transistor M5 may be connected to the first electrode of the first transistor M1, and a gate electrode of the fifth transistor M5 may receive the emission control signal EM.

In an embodiment, each of the first transistor M1, the second transistor M2, the third transistor M3, the fourth transistor M4, and the fifth transistor M5 may be an N-type transistor. In an alternative embodiment, at least one selected from the first transistor M1, the second transistor M2, the third transistor M3, the fourth transistor M4, and the fifth transistor M5 may be a P-type transistor.

In an embodiment, each of the first transistor M1, the second transistor M2, the third transistor M3, the fourth transistor M4, and the fifth transistor M5 may be one of an oxide semiconductor transistor, an amorphous silicon transistor, and polycrystalline silicon transistors.

The storage capacitor CST may be connected between the first node N1 and the second node N2. A first electrode of the storage capacitor CST may be connected to the first node N1, and a second electrode of the storage capacitor CST may be connected to the second node N2. The storage capacitor CST may store a voltage corresponding to a voltage difference between the first node N1 and the second node N2.

The hold capacitor CHD may be connected between the first node N1 and the first power line. A first electrode of the hold capacitor CHD may be connected to the first node N1, and a second electrode of the hold capacitor CHD may be connected to the first power line.

The light emitting element LE may be connected between a second power line providing the second power voltage ELVSS and the first node N1. An anode electrode of the light emitting element LE may be connected to the first node N1, and a cathode electrode of the light emitting element LE may receive the second power voltage ELVSS. The light emitting element LE may emit light based on the driving current.

In an embodiment, the light emitting element LE may be an OLED. In an alternative embodiment, the light emitting element LE may be an inorganic light emitting diode or a quantum dot light emitting diode.

Figure 4:
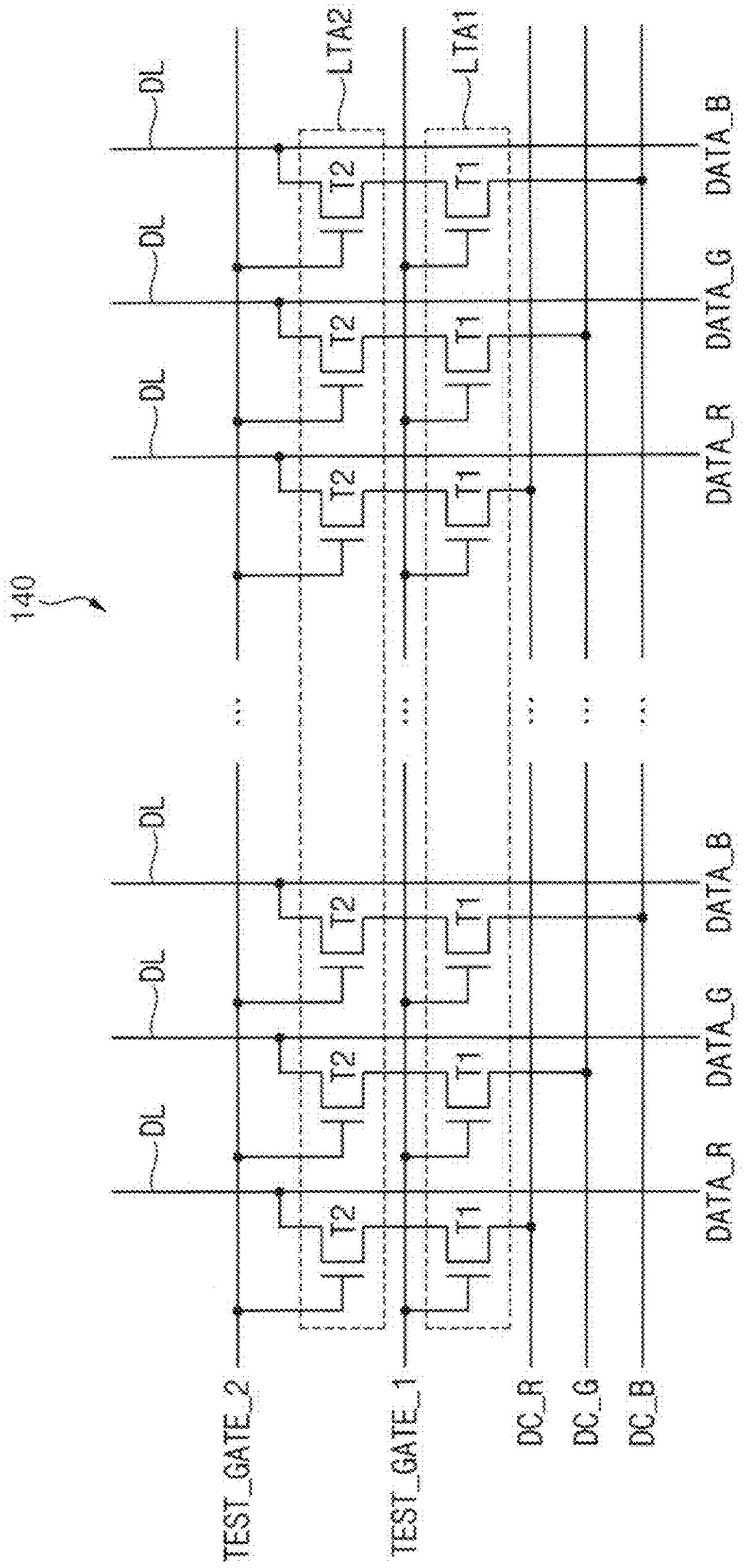
FIG. 4 is a circuit diagram illustrating a lighting test circuit according to an embodiment.

FIG. 4 is a circuit diagram illustrating the lighting test circuit 140 according to an embodiment.

Referring to FIG. 4, in an embodiment, the lighting test circuit 140 may include a first lighting test array LTA1 and a second lighting test array LTA2. The first lighting test array LTA1 may include a first test transistor T1. The second lighting test array LTA2 may include a second test transistor T2. In an embodiment, as shown in FIG. 4, each of the first test transistor T1 and the second test transistor T2 may be provided in plural. Each of the first test transistor T1 and the second test transistor T2 may include a first electrode, a second electrode, and a gate electrode.

The first electrode of the first test transistor T1 may receive lighting test voltages DC_R, DC_G, and DC_B, and the second electrode of the first test transistor T1 may be connected to the first electrode of the second test transistor T2. The gate electrode of the first test transistor T1 may receive a first test control signal TEST_GATE_1. The lighting test voltages DC_R, DC_G, and DC_B may include a first lighting test voltage DC_R for a lighting test of the red pixel, a second lighting test voltage DC_G for a lighting test of the green pixel, and a third lighting test voltage DC_B for a lighting test of the blue pixel.

The first electrode of the second test transistor T2 may be connected to the second electrode of the first test transistor T1, and the second electrode of the second test transistor T2 may be connected to the data line DL. The gate electrode of the second test transistor T2 may receive a second test control signal TEST_GATE_2. In an embodiment, as shown in FIG. 4, as the first electrode of the second test transistor T2 is connected to the second electrode of the first test transistor T1, the first test transistor T1 and the second test transistor T2 may be connected to each other in series.

Each of the first test transistors T1 and the second test transistors T2 may be an N-type transistor. In an embodiment, each of the first test transistors T1 and the second test transistors T2 may be one of an oxide semiconductor transistor and an amorphous silicon transistor.

Figure 5:
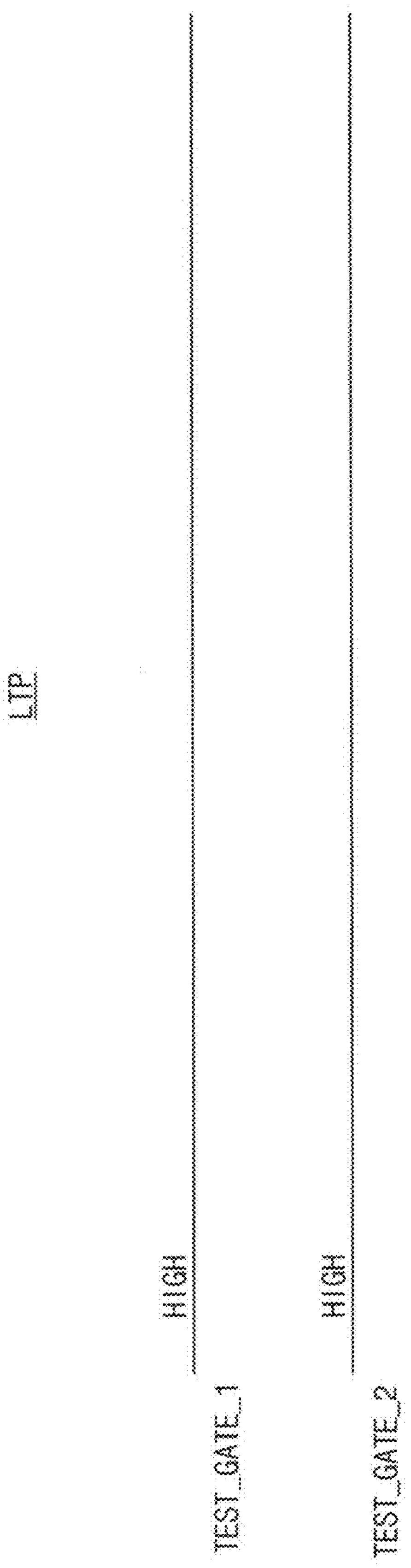
FIG. 5 is a timing diagram for describing a lighting test period according to an embodiment.

FIG. 5 is a timing diagram for describing a lighting test period LTP according to an embodiment.

Referring to FIGS. 4 and 5, each of the first test control signal TEST_GATE_1 and the second test control signal TEST_GATE_2 may have a constant high voltage during the lighting test period LTP. The high voltage may be a gate turn-on voltage of the N-type transistor.

As each of the first test control signal TEST_GATE_1 and the second test control signal TEST_GATE_2 has the constant high voltage during the lighting test period LTP, the first test transistor T1 and the second test transistor T2 may be turned on, and the lighting test voltage DC_R, DC_G, and DC_B may be applied to the data line DL. Accordingly, the lighting test voltage DC_R, DC_G, and DC_B may be provided to the pixel PX through the data line DL during the lighting test period LTP, and a lighting test of the display panel 110 may be performed.

Figure 6:
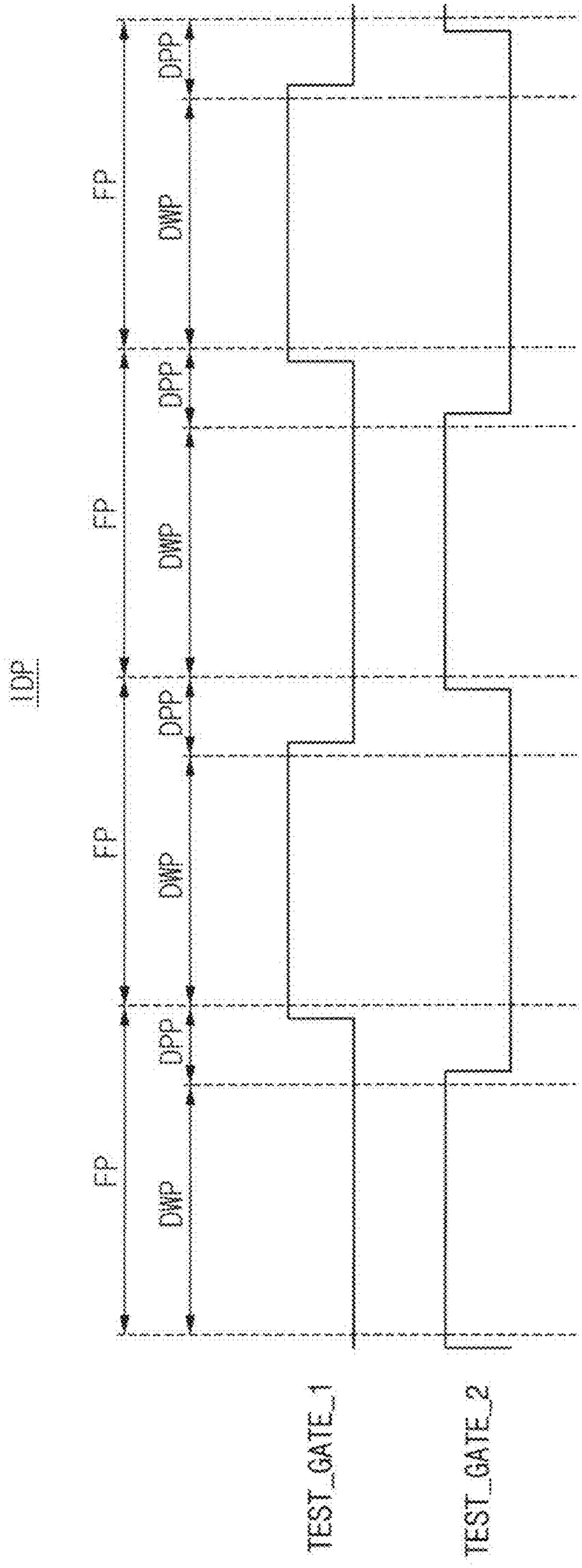
FIG. 6 is a timing diagram for describing an image display period according to an embodiment.

FIG. 6 is a timing diagram for describing an image display period IDP according to an embodiment.

Referring to FIGS. 4 and 6, each of the first test control signal TEST_GATE_1 and the second test control signal TEST_GATE_2 may have a low voltage and a high voltage which are alternating with each other during the image display period IDP. The low voltage may be a gate turn-off voltage of the N-type transistor.

In an embodiment, at least one selected from the first test control signal TEST_GATE_1 and the second test control signal TEST_GATE_2 may have the low voltage at all time points in the image display period IDP. In such an embodiment, the first test control signal TEST_GATE_1 and the second test control signal TEST_GATE_2 may not have the high voltage simultaneously at all time points in the image display period IDP. In such an embodiment, the high voltage of the first test control signal TEST_GATE_1 and the high voltage of the second test control signal TEST_GATE_2 may not overlap during the image display period IDP.

In such an embodiment where at least one selected from the first test control signal TEST_GATE_1 and the second test control signal TEST_GATE_2 has the low voltage at all time points in the image display period IDP, at least one selected from the first test transistor T1 and the second test transistor T2 may be turned off at all time points in the image display period IDP, and the lighting test voltage DC_R, DC_G, and DC_B may not be applied to the data line DL. Accordingly, the data voltage DATA_R, DATA_G, and DATA_B may be provided to the pixel PX through the data line DL in the image display period IDP, and the display panel 110 may display an image.

In a conventional display device, a lighting test circuit may include a single lighting test array including N-type test transistors, and a test control signal applied to a gate electrode of the test transistor during an image display period may have a constant low voltage. When the constant low voltage is applied to the gate electrode of the test transistor over a long period of time, a threshold voltage of the test transistor may be negatively shifted. When the threshold voltage of the test transistor is negatively shifted, even when the low voltage is applied to the gate electrode of the test transistor in the image display period, the test transistor may be turned on, and accordingly, a lighting test voltage may be applied to the data line in the image display period.

In an embodiment of the disclosure, the lighting test circuit 140 may include the test transistors T1 and T2 which are connected to each other in series, and the test control signal TEST_GATE_1 and TEST_GATE_2 applied to the gate electrode of the test transistor T1 and T2 in the image display period IDP may have the low voltage and the high voltage which are alternating with each other, so that the threshold voltage of the test transistor T1 and T2 may not be negatively shifted during the image display period IDP. In such an embodiment, the first test control signal TEST_GATE_1 and the second test control signal TEST_GATE_2 may not simultaneously have the high voltage at all time points in the image display period IDP, so that the lighting test voltage DC_R, DC_G, and DC_B may not be applied to a data line DL in the image display period IDP.

The image display period IDP may include frame periods FP, and each of the frame periods FP may include a data write period DWP and a data porch period DPP. The frame periods FP may be periods in which frames of an image are respectively displayed. The data write period DWP may be a period in which the data voltage DATA_R, DATA_G, and DATA_B is written to the data line DL, and the data porch period DPP may be a period in which the data voltage DATA_R, DATA_G, and DATA_B is not written to the data line DL. The data porch period DPP may be positioned between the data write periods DWP.

In an embodiment, each of the first test control signal TEST_GATE_1 and the second test control signal TEST_GATE_2 may be switched from the low voltage to the high voltage or from the high voltage to the low voltage in the data porch period DPP. In such an embodiment, a voltage level of each of the first test control signal TEST_GATE_1 and the second test control signal TEST_GATE_2 may be changed in the data porch period DPP. Accordingly, interference of the test control signals TEST_GATE_1 and TEST_GATE_2 with respect to the data voltage DATA_R, DATA_G, and DATA_B written in the data write period DWP may be substantially reduced or effectively prevented.

In an embodiment, each of the first test control signal TEST_GATE_1 and the second test control signal TEST_GATE_2 may be switched from the low voltage to the high voltage or from the high voltage to the low voltage every one frame period FP. In an embodiment, for example, a period of each of the first test control signal TEST_GATE_1 and the second test control signal TEST_GATE_2 may be two frame periods FP. As the test control signals TEST_GATE_1 and TEST_GATE_2 are switched from the low voltage to the high voltage or from the high voltage to the low voltage every one frame period FP, the test control signals TEST_GATE_1 and TEST_GATE_2 may have a relatively high frequency, and a degree to which the threshold voltage of the test transistor T1 and T2 is negatively or positively shifted may be substantially reduced.

Figure 7:
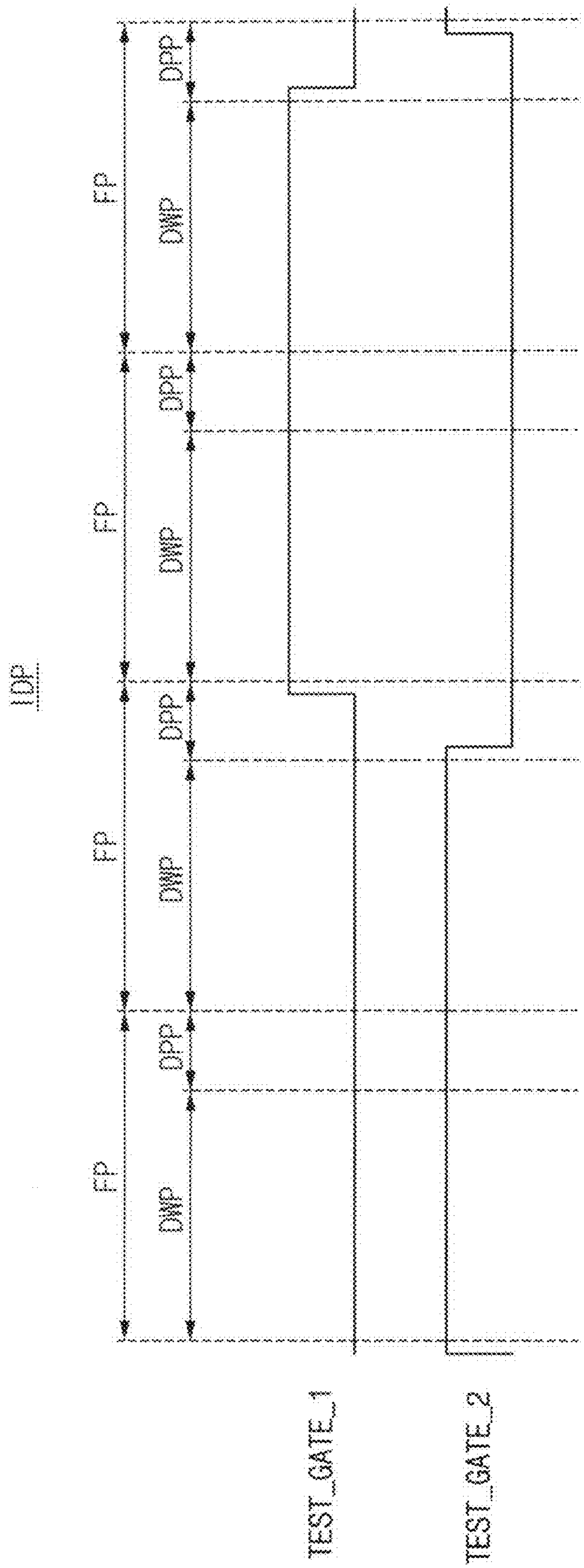
FIG. 7 is a timing diagram for describing an image display period according to an alternative embodiment.

FIG. 7 is a timing diagram for describing the image display period IDP according to an alternative embodiment.

Referring to FIGS. 4 and 7, in an alternative embodiment, each of the first test control signal TEST_GATE_1 and the second test control signal TEST_GATE_2 may be switched from the low voltage to the high voltage or from the high voltage to the low voltage every plurality of frame periods FP. In an embodiment, for example, a period of each of the first test control signal TEST_GATE_1 and the second test control signal TEST_GATE_2 may be four or more frame periods FP. In such an embodiment, as the test control signals TEST_GATE_1 and TEST_GATE_2 are switched from the low voltage to the high voltage or from the high voltage to the low voltage every plurality of frame periods FP, the test control signals TEST_GATE_1 and TES- T_GATE_2 may have a relatively low frequency, and power consumption of the display device 100 may be substantially reduced.

Figure 8:
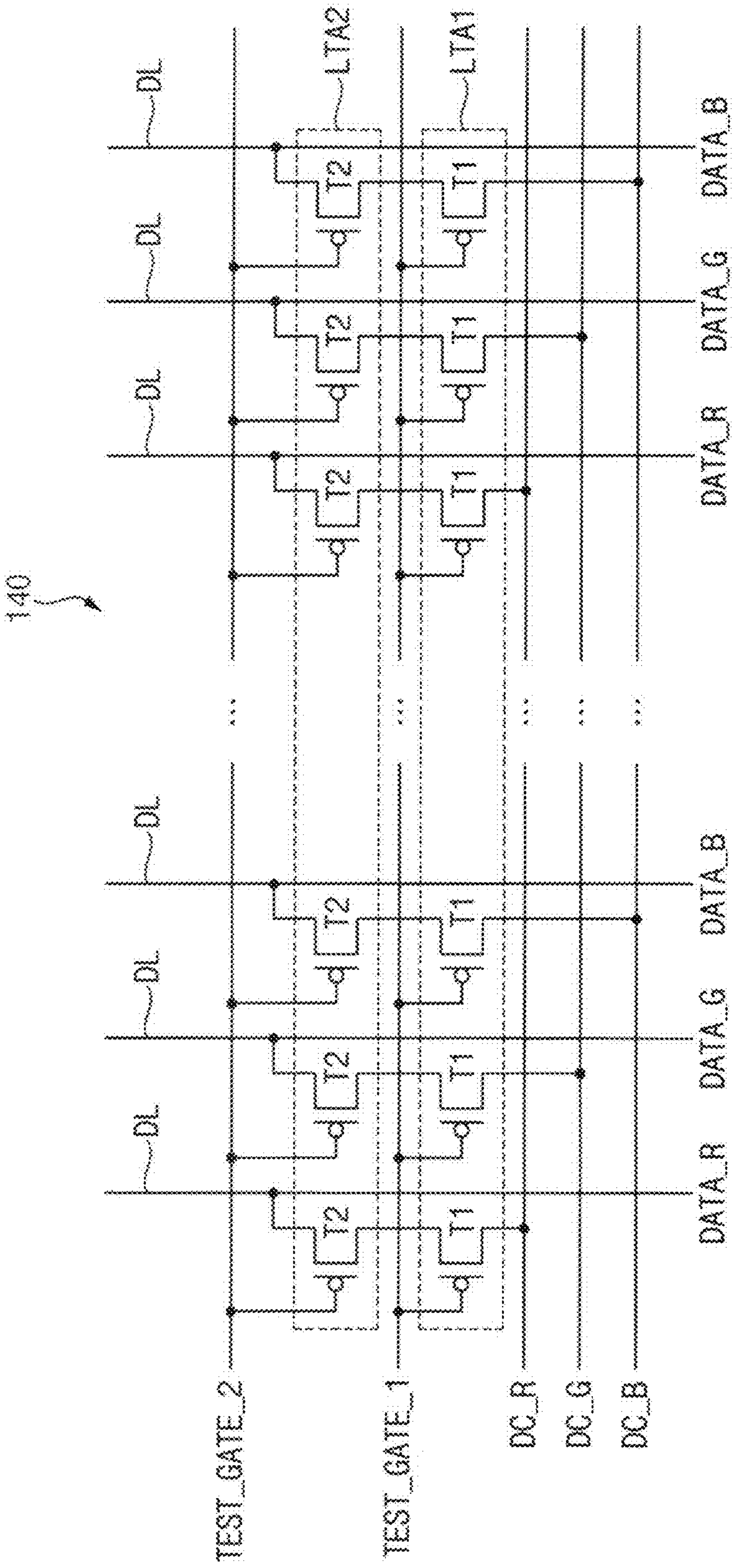
FIG. 8 is a circuit diagram illustrating a lighting test circuit according to an embodiment.

FIG. 8 is a circuit diagram illustrating the lighting test circuit 140 according to an embodiment.

Descriptions of the same or like components of the lighting test circuit 140 in FIG. 8 as those described above with reference to FIG. 4, will hereinafter be omitted or simplified.

Referring to FIG. 8, in an embodiment, the lighting test circuit 140 may include a first lighting test array LTA1 and a second lighting test array LTA2. The first lighting test array LTA1 may include a plurality of first test transistors T1. The second lighting test array LTA2 may include a plurality of second test transistors T2. In such an embodiment, each of the first test transistors T1 and the second test transistors T2 may be a P-type transistor.

Figure 9:
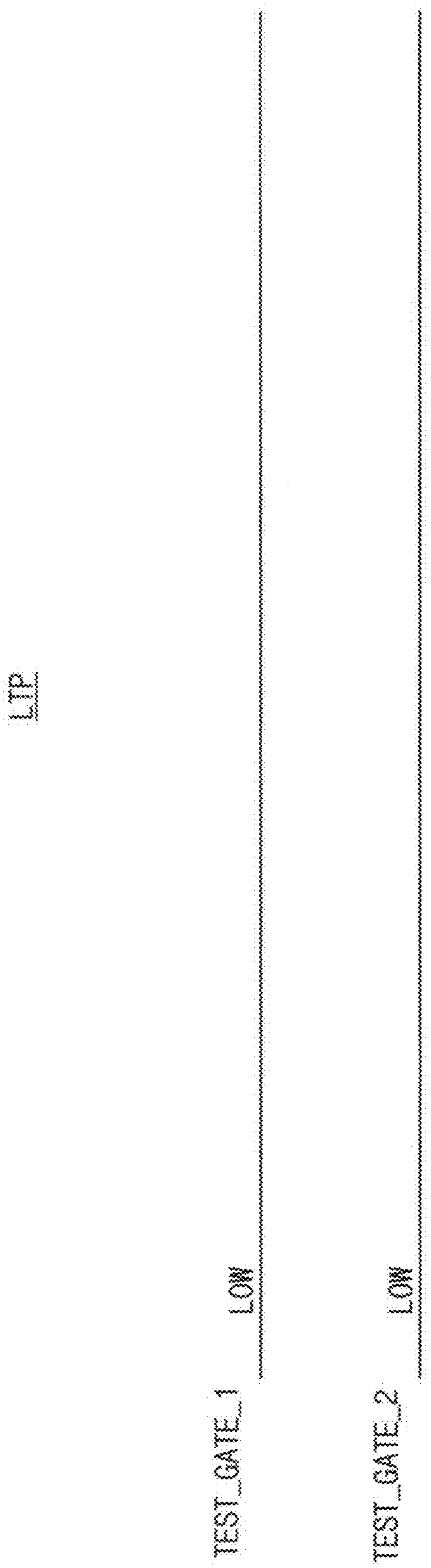
FIG. 9 is a timing diagram for describing a lighting test period according to an embodiment.

FIG. 9 is a timing diagram for describing a lighting test period LTP according to an embodiment.

Referring to FIGS. 8 and 9, each of the first test control signal TEST_GATE_1 and the second test control signal TEST_GATE_2 may have a constant low voltage during the lighting test period LTP. The low voltage may be a gate turn-on voltage of the P-type transistor.

Each of the first test control signal TEST_GATE_1 and the second test control signal TEST_GATE_2 may have the constant low voltage during the lighting test period LTP, so that the first test transistor T1 and the second test transistor T2 may be turned on, and the lighting test voltage DC_R, DC_G, and DC_B may be applied to the data line DL. Accordingly, the lighting test voltage DC_R, DC_G, and DC_B may be provided to the pixel PX through the data line DL during the lighting test period LTP, and a lighting test of the display panel 110 may be performed.

Figure 10:
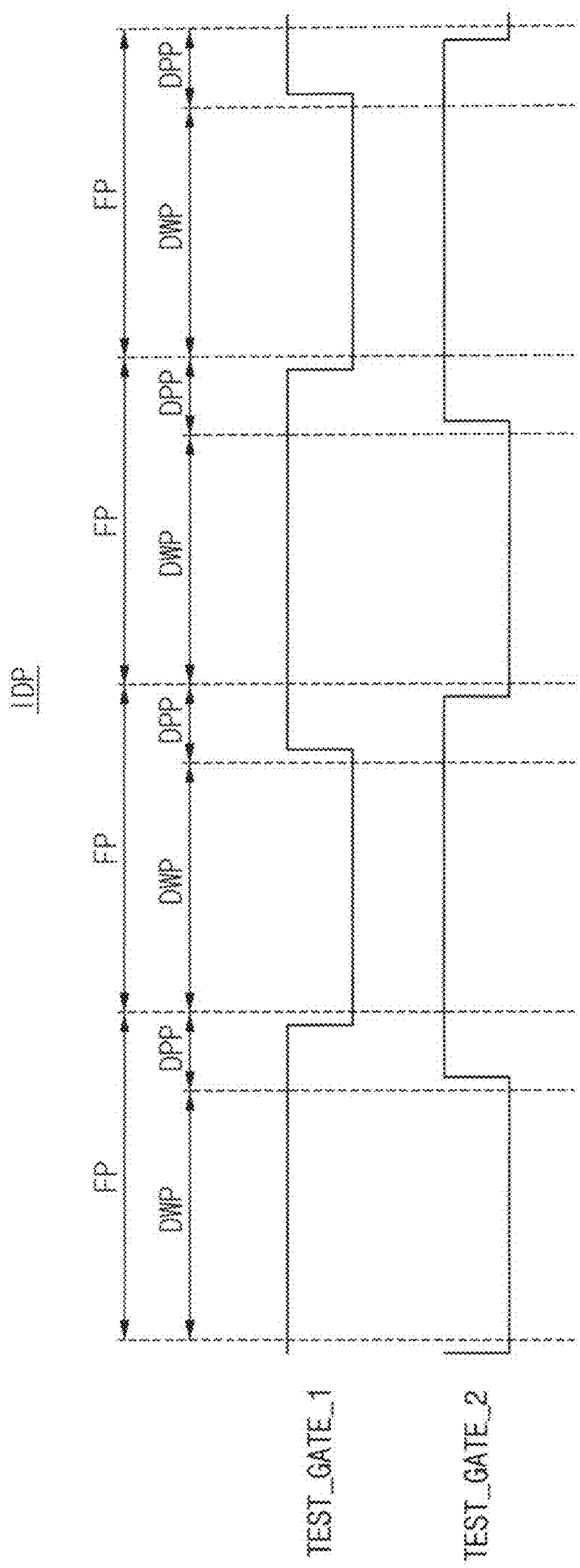
FIG. 10 is a timing diagram for describing an image display period according to an embodiment.

FIG. 10 is a timing diagram for describing an image display period IDP according to an embodiment.

Referring to FIGS. 8 and 10, each of the first test control signal TEST_GATE_1 and the second test control signal TEST_GATE_2 may have a low voltage and a high voltage which are alternating with each other in the image display period IDP. The high voltage may be a gate turn-off voltage of the P-type transistor.

In an embodiment, at least one selected from the first test control signal TEST_GATE_1 and the second test control signal TEST_GATE_2 may have the high voltage at all points in the image display period IDP. In such an embodiment, the low voltage of the first test control signal TEST_GATE_1 and the low voltage of the second test control signal TEST_GATE_2 may not overlap during the image display period IDP.

In such an embodiment where at least one selected from the first test control signal TEST_GATE_1 and the second test control signal TEST_GATE_2 has the high voltage at all time points in the image display period IDP, at least one selected from the first test transistor T1 and the second test transistor T2 may be turned off at all time points in the image display period IDP, and the lighting test voltage DC_R, DC_G, and DC_B may not be applied to the data line DL. Accordingly, the data voltage DATA_R, DATA_G, and DATA_B may be provided to the pixel PX through the data line DL in the image display period IDP, and the display panel 110 may display an image.

In an embodiment, each of the first test control signal TEST_GATE_1 and the second test control signal TEST_GATE_2 may be switched from the low voltage to the high voltage or from the high voltage to the low voltage in the data porch period DPP. In such an embodiment, a voltage level of each of the first test control signal TEST_GATE_1 and the second test control signal TEST_GATE_2 may be changed in the data porch period DPP.

In an embodiment, each of the first test control signal TEST_GATE_1 and the second test control signal TEST_GATE_2 may be switched from the low voltage to the high voltage or from the high voltage to the low voltage every one frame period FP. In an embodiment, for example, a period of each of the first test control signal TEST_GATE_1 and the second test control signal TEST_GATE_2 may be two frame periods FP.

Figure 11:
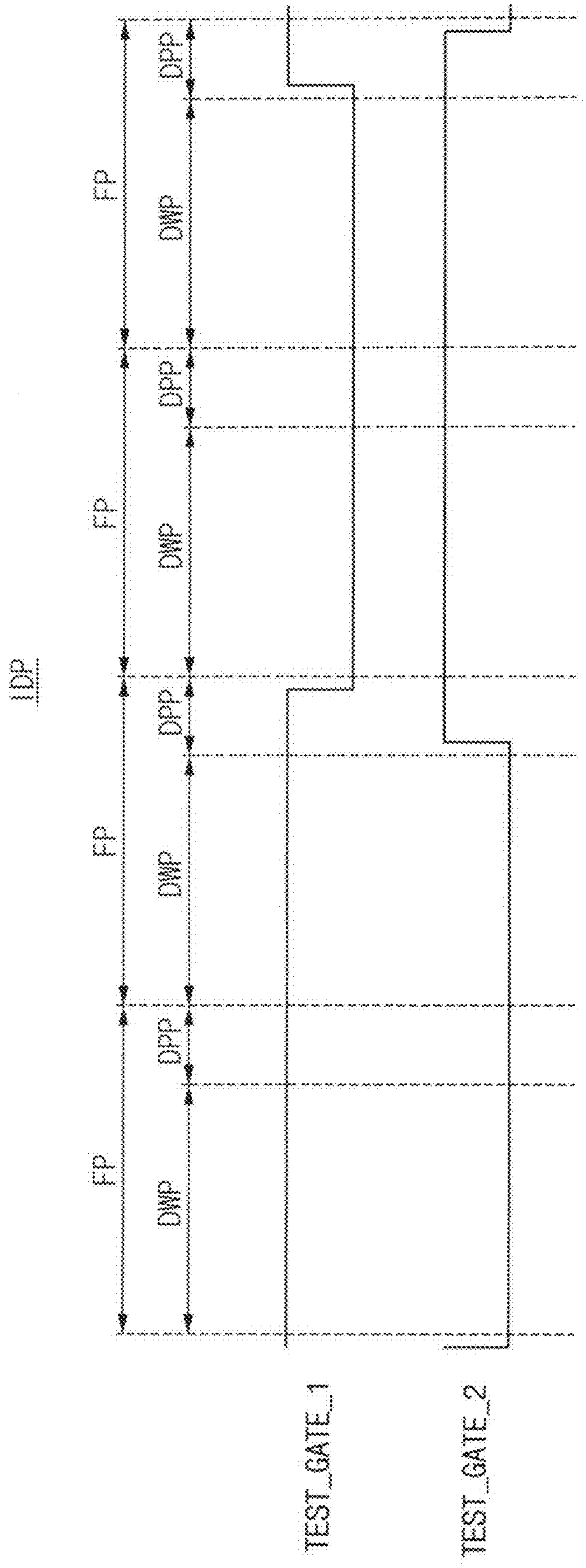
FIG. 11 is a timing diagram for describing an image display period according to an alternative embodiment.

FIG. 11 is a timing diagram for describing an image display period IDP according to an alternative embodiment.

Referring to FIGS. 8 and 11, in an alternative embodiment, each of the first test control signal TEST_GATE_1 and the second test control signal TEST_GATE_2 may be switched from the low voltage to the high voltage or from the high voltage to the low voltage every plurality of frame periods FP. In an embodiment, for example, a period of each of the first test control signal TEST_GATE_1 and the second test control signal TEST_GATE_2 may be four or more frame periods FP.

Figure 12:
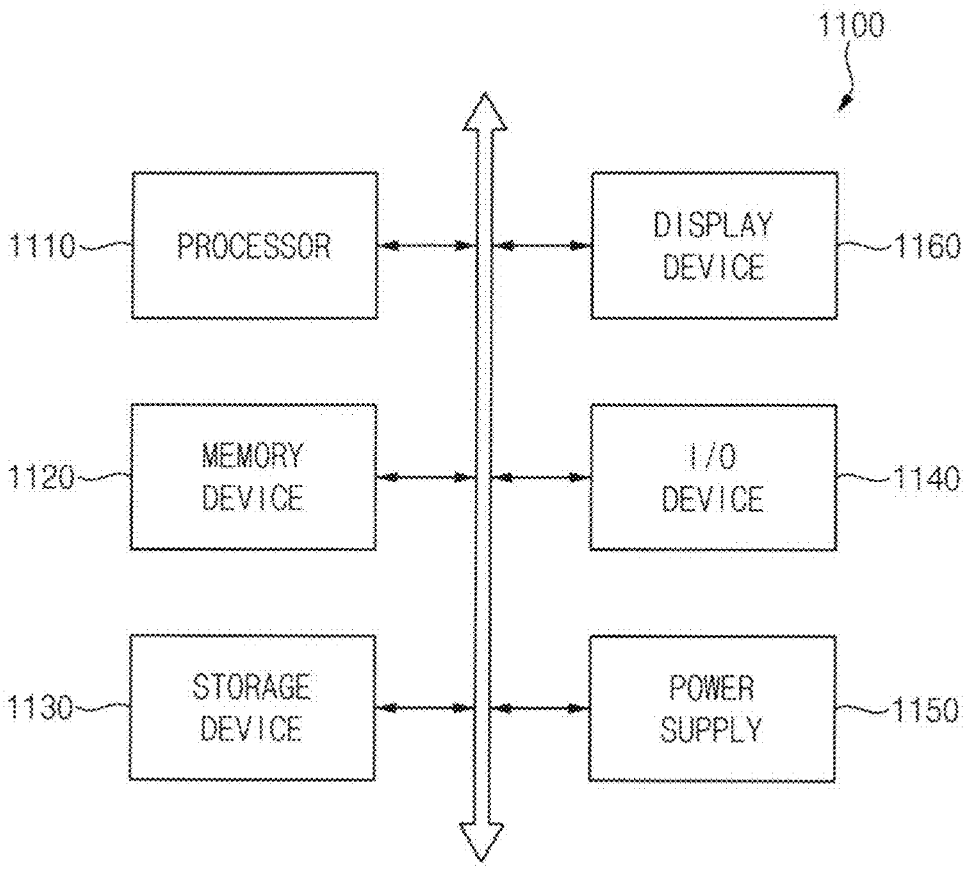
FIG. 12 is a block diagram illustrating an electronic apparatus including a display device according to an embodiment.

FIG. 12 is a block diagram illustrating an electronic apparatus 1100 including a display device 1160 according to an embodiment.

Referring to FIG. 12, an embodiment of the electronic apparatus 1100 may include a processor 1110, a memory device 1120, a storage device 1130, an input/output ("I/O") device 1140, a power supply 1150, and a display device 1160. The electronic apparatus 1100 may further include a plurality of ports for communicating with a video card, a sound card, a memory card, a universal serial bus ("USB") device, etc.

The processor 1110 may perform particular calculations or tasks. In an embodiment, the processor 1110 may be a microprocessor, a central processing unit ("CPU"), or the like. The processor 1110 may be coupled to other components via an address bus, a control bus, a data bus, or the like. In an embodiment, the processor 1110 may be coupled to an extended bus such as a peripheral component interconnection ("PCI") bus.

The memory device 1120 may store data for operations of the electronic apparatus 1100. In an embodiment, the memory device 1120 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may include a solid state drive ("SSD") device, a hard disk drive ("HDD") device, a CD-ROM device, or the like. The I/O device 1140 may include an input device such as a keyboard, a keypad, a touchpad, a touch-screen, a mouse device, etc., and an output device such as a speaker, a printer, etc. The power supply 1150 may supply a power used for the operation of the electronic apparatus 1100. The display device 1160 may be coupled to other components via the buses or other communication links.

In an embodiment of the display device 1160, a lighting test circuit may include a first test transistor and a second test transistor which are connected to each other in series, and a low voltage and a high voltage which are alternating with each other may be applied to a gate electrode of each of the first test transistor and the second test transistor, such that threshold voltages of the first and second test transistors may not be negatively or positively shifted. Accordingly, a lighting test voltage may not be applied to a pixel in an image display period.

Embodiments of the display device according to the invention may be applied to a display device included in a computer, a notebook, a mobile phone, a smart phone, a smart pad, a portable multimedia player ("PMP"), a personal digital assistant ("PDA"), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display panel, comprising:

a pixel connected to a scan line and a data line; and a lighting test circuit which provides a lighting test voltage to the pixel through the data line, wherein the lighting test circuit includes:

a first test transistor including a first electrode which receives the lighting test voltage, a second electrode, and a gate electrode which receives a first test control signal; and a second test transistor including a first electrode connected to the second electrode of the first test transistor, a second electrode connected to the data line, and a gate electrode which receives a second test control signal, wherein the image display period includes a plurality of frame periods that each include a data write period in which the data voltage is written to the data line and a data porch period in which the data voltage is not written to the data line, and wherein during the data write period only one of the first test control signal and the second test control signal has a high voltage and during at least a portion of the data porch period both the first test control signal and the second test control signal simultaneously have a low voltage.

2. The display panel of claim 1, wherein each of the first test transistor and the second test transistor is an N-type transistor.

3. The display panel of claim 2, wherein each of the first test control signal and the second test control signal has a low voltage and a high voltage which are alternating with each other in an image display period in which a data voltage is provided to the pixel through the data line, and wherein at least one selected from the first test control signal and the second test control signal has the low voltage at all time points in the image display period.

4. The display panel of claim 3, and wherein each of the first test control signal and the second test control signal is switched from the low voltage to the high voltage or from the high voltage to the low voltage in the data porch period.

5. The display panel of claim 3, wherein each of the first test control signal and the second test control signal is switched from the low voltage to the high voltage or from the high voltage to the low voltage every one frame period in the image display period.

6. The display panel of claim 3, wherein each of the first test control signal and the second test control signal is switched from the low voltage to the high voltage or from the high voltage to the low voltage every plurality of frame periods in the image display period.

7. The display panel of claim 2, wherein each of the first test control signal and the second test control signal has a constant high voltage in a lighting test period in which the lighting test voltage is provided to the pixel through the data line.

8. The display panel of claim 1, wherein each of the first test transistor and the second test transistor is one of an oxide semiconductor transistor and an amorphous silicon transistor.

9. A display device, comprising:

a pixel connected to a scan line and a data line;

a scan driver which provides a scan signal to the pixel through the scan line;

a data driver which provides a data voltage to the pixel through the data line; and a lighting test circuit which provides a lighting test voltage to the pixel through the data line, wherein the lighting test circuit includes:

a first test transistor including a first electrode which receives the lighting test voltage, a second electrode, and a gate electrode which receives a first test control signal; and a second test transistor including a first electrode connected to the second electrode of the first test transistor, a second electrode connected to the data line, and a gate electrode which receives a second test control signal, wherein the image display period includes a plurality of frame periods that each include a data write period in which the data voltage is written to the data line and a data porch period in which the data voltage is not written to the data line, and wherein during the data write period only one of the first test control signal and the second test control signal has a high voltage and during at least a portion of the data porch period both the first test control signal and the second test control signal simultaneously have a low voltage data.

10. The display device of claim 9, wherein each of the first test transistor and the second test transistor is an N-type transistor.

11. The display device of claim 10, wherein each of the first test control signal and the second test control signal has a low voltage and a high voltage which are alternating with each other in an image display period in which the data voltage is provided to the pixel through the data line, and wherein at least one selected from the first test control signal and the second test control signal has the low voltage at all time points in the image display period.

12. The display device of claim 11, wherein each selected from the first test control signal and the second test control signal is switched from the low voltage to the high voltage or from the high voltage to the low voltage in the data porch period.

13. The display device of claim 11, wherein each of the first test control signal and the second test control signal is switched from the low voltage to the high voltage or from the high voltage to the low voltage every one frame period in the image display period.

14. The display device of claim 11, wherein each of the first test control signal and the second test control signal is switched from the low voltage to the high voltage or from the high voltage to the low voltage every plurality of frame periods in the image display period.

15. The display device of claim 10, wherein each of the first test control signal and the second test control signal has a constant high voltage in a lighting test period in which the lighting test voltage is provided to the pixel through the data line.

* * * * *